United States Patent Office 2,967,159
Patented Jan. 3, 1961

2,967,159

HYDRODESULFURIZATION CATALYST AND METHOD OF PREPARING SAME

Elroy Merle Gladrow and Paul Thomas Parker, Baton Rouge, La., assignors to Esso Research and Engineering Company, a corporation of Delaware No Drawing. Filed May 22, 1957, Ser. No. 660,761

8 Claims. (Cl. 252—455)

This invention relates to catalyst compositions and method for preparing catalyst compositions. More specifically, this invention pertains to a catalyst composition especially adapted for the hydrodesulfurization of hydrocarbon fractions and to a particular method of preparing such compositions which gives unique physical chemical characteristics to these compositions.

Catalyst compositions comprising a maor proportion of an alumina-containing support or carrier material and a minor proportion of one or more metal oxides such as molybdenum oxide, chromium oxide, cobalt oxide, and the like, have been used for a variety of hydrocarbon conversion processes such as hydrogenation, dehydrogenation, reforming, and aromatization. A particular composition that is used quite extensively in hydrocarbon conversions, particularly for removing sulfur and nitrogen compounds and adding hydrogen to the more highly unsaturated constituents in the hydrocarbon feeds, is one containing molybdenum oxide and cobalt oxide in an equimolar or lesser amount, distributed upon a base or support consisting essentially of alumina. In these, as in practically all types of hydrocarbon conversion catalysts, it has been found that small differences in the composition or method of preparation of the catalyst, has an important effect upon the catalytic properties of the composition.

It is the obect of the present invention to prepare novel catalyst compositions.

It is also the object of this invention to prepare hydrodesulfurization catalysts particularly containing molybdenum oxide and cobalt oxide in a unique association with a particular support material.

It is a further object of this invention to provide the art with a novel method for preparing highly effective hydrodesulfurization catalysts comprising molybdenum oxide, cobalt oxide and a support or carrier material.

These and other objects will appear more clearly from the detailed specification and claims which follow.

It has now been found that highly effective hydrodesulfurization catalysts may be prepared in a novel manner by preparing a synthetic zeolite or molecular sieve of large pore diameter (approximately 13 A.) by reaction of sodium aluminate and sodium silicate in certain ratios and under certain conditions thereupon converting the resultant sodium form of zeolite to the corresponding cobalt form by treatment with a suitable cobalt compound and compositing the cobalt form of zeolite with molybdenum oxide in sufficient amount to impart the necessary catalytic properties thereto.

It has been known for some time that certain natural zeolites, such as chabazite and analcite and the like, have a property of selectively adsorbing normal paraffins and rejecting the branch chain isomers. These zeolites have crystal patterns forming structures containing a large number of cavities interconnected with a number of still smaller holes or pores. These pores are of exceptional uniformity of size and diameter. Only molecules small enough to enter the pores can be adsorbed. The bores may vary from less than 3 to more than 15 A. in diameter, but for any one zeolite, the pores are of substantially uniform size.

The patent and scientific literature contains numerous references to the adsorbing action of natural and synthetic zeolites. Thus synthetic zeolites have been described, for instance, by Barrer (U.S. Patent No. 2,306,-610) and Black (U.S. Patent No. 2,442,191). Zeolites, both natural and synthetic, vary considerably in composition, but most generally contain silicon, aluminum, oxygen, and an alkali metal and/or an alkaline earth metal element, e.g., sodium and/or calcium, magnesium, etc. Analcite has the empirical formula $NaAlSi_2O_6.H_2O$, which on treatment with $Ca^{++}$ is converted, on subsequent dehydration, to the molecular sieve material $$CaNa_2Al_2Si_4O_{12}.2H_2O$$

In the Black, U.S. Patent No. 2,442,191, a synthetic zeolite with molecular sieve properties having the empirical formula $4CaO.Al_2O_3.4SiO_2$ is described. Further description of these zeolites is found in the article entitled "Molecular Sieve Action of Solids" in Quarterly Reviews, vol. III, pages 293 to 330 (1949), published by the Chemical Society (London).

The naturally occurring zeolites having molecular sieve properties do not occur abundantly in nature and are expensive. Efforts in the past have been made to supply this deficiency by synthesis of compositions having molecular sieve properties. Though the preparation of zeolites has long been known, only a few have structures and crystal lattice patterns allowing the ready separation of, for example, normal from branch chain and cyclic or aromatic compounds, or the segregation of aromatic compounds from hydrocarbon streams.

High yields of crystalline molecular sieve materials having pore sizes large enough to adsorb aromatic molecules are obtained by controlled mixing under carefully controlled conditions and in suitable proportions certain forms of sodium silicate and sodium aluminate followed by heat aging under relatively mild conditions. The product thus obtained comprises a crystalline sodium alumino-silicate having uniform pores of a size suitable for admitting aromatic hydrocarbons.

In order to obtain substantially instantaneous production of crystals it is essential to employ as one reactant a sodium silicate having a high ratio of soda to silica. The ratio is at least 0.8/1 and may be as hgih as 2/1, preferably, however, the ratio is 1/1 and the desired reagent is sodium metasilicate. Water glass or sodium silicates having lower $Na_2O/SiO_2$ ratios do not form the sieves unless subjected to extended heat soaking or crystallization periods with added caustic in the system.

The composition of the sodium aluminate is less critical than that of the sodium silicate. Sodium aluminate having any ratio of soda to alumina in the range of 1/1 to 3/1 may be employed. However, a sodium aluminate having a high ratio of soda to alumina is preferred and a sodium aluminate having the ratio 1.5/1 $Na_2O/Al_2O_3$ is particularly desirable. The amounts of sodium silicate solution and sodium aluminate solution is such that the ratio of silica to alumina in the final mixture is at least 2.2/1 and preferably about 3/1 to 6/1.

The method of mixing the sodium metasilicate and sodium aluminate solutions must be carried out in a manner allowing formation of a precipitate having a uniform composition. A preferred method is to add to the sodium aluminate to the sodium metasilicate at ambient temperatures using rapid and efficient agitation to make a homogeneous paste. Thereafter the mixture is heated to about 160° to about 250° F., preferably 180 to 215° F., for at least 1 hour or for a period as long as 200 hours or more to insure crystallization in the crystal form necessary to adsorb aromatic molecules. The heat soaking period is essential to produce products having pore openings of about 13 A. diameter necessary for the adsorption of aromatic molecules. The concentration of the silicate may be in the range of about 30 to 300 grams of $SiO_2$ per liter, preferably in the range of about 100 to 200 grams per liter. The solution of sodium aluminate has a concentration in the range of 40 to 400 grams $Al_2O_3$ per liter, preferably about 200 to 300 grams per liter.

The precipitated sodium alumino-silicate, after the heat soaking period necessary to develop the desired crystal properties, is separated from the reaction liquids by filtration and is thoroughly washed with water. The washed material is then dried and activated by calcination. Drying may be readily effected by heating in an oven or the like to temperatures of about 250° F. and calcination of the dried material may be effected within the range of about 400 to 1000° F., preferably at about 700° to 900° F.

In accordance with the present invention, the large pore molecular sieve zeolite prepared as described above is base exchanged with a soluble cobalt compound in order to exchange cobalt ions for sodium ions in the zeolite. This base exchange can be effected with the washed zeolite on the filter or with the dried and/or calcined zeolite.

Suitable cobalt solutions that may be used are cobalt ammonium chloride and other soluble complex cobalt ammines, as well as solutions of the chloride, nitrate, acetate, and sulfate salts of cobalt. Inasmuch as the alumino silicate anionic crystalline cage which is the sieve body is desintegrated by strong acid media, it is necessary that the base exchange medium be maintained at a pH no lower than about 4. Also, because of the alkaline nature of the sodium alumino silicate sieve slurries, care must be taken when using cobalt salt solutions for the metal exchange operation not to precipitate cobalt hydroxide. It is preferred but not necessary that solutions of complex cobalt ammines be employed in the base exchange step to convert the sieve to the cobalt form. The concentration of the cobalt solution is not critical, and concentrations of about 1–20 wt. percent are equally effective. Enough cobalt should be added to effect exchange with at least half and preferably about two-thirds or more, of the sodium atoms. The exchange operation may be carried out at ambient temperatures or at temperatures up to 212° F. It has been found that base exchange of only 50% of the sodium atoms alters the adsorptive properties of the alumino silicate sieve but the residual soda exerts deleterious action in any operation where this material is used as a catalytic agent. It has further been found that exchange of two-thirds or more of the soda with the cobalt alters not only the adsorptive properties but also makes the residual soda ineffective as a catalyst poison. For the purposes of this invention it is preferred that about two-thirds or more of the sodium is replaced with cobalt via the base exchange operation.

The cobalt form of the zeolite thus produced is thereupon composited with molybdenum oxide. This may be readily accomplished by treating the cobalt zeolite with sufficient ammonium molybdate solution to incorporate the desired amount of molybdenum oxide. Ammonium molybdate solution is a preferred material to use in the impregnation step as it is basic in character and does not produce any degrading action on the alumino silicate anionic lattice. The amount of molybdena composited with the cobalt-form sieve may vary in the range of about 5–20% of the total material.

The following examples are illustrative of the present invention.

*Example 1*

A solution comprising 435 grams of commercial sodium metasilicate (29.1% $Na_2O$ and 28.7% $SiO_2$) and 1305 cc. water are placed in a 4 liter vessel. To this are added at room temperature and with rapid and efficient stirring 265 grams of a sodium aluminate solution (20 wt. percent $Al_2O_3$ and $3Na_2O.2Al_2O_3$ mol ratio). After stirring for 5 minutes an additional 1000 cc. $H_2O$ are added and the composite heated under reflux conditions for a total time of 240 hours. The crystalline material was filtered, washed well with water and dried in an oven at 250° F. This crystalline material is identified as a molecular sieve having a uniform pore opening of about 13 Angstrom units. After calcining the sieves at 850° F. for 4 hours the material was examined for its adsorptive properties and showed a capacity for n-heptane of 0.20 liquid cc. of n-heptane per gram of adsorbent; for toluene the capacity was 0.23 cc./gram; and for 2-methylpentane the capacity was 0.19 cc./gram.

The cobalt form of the above molecular sieve is prepared as follows. A 400 gram portion of the sieves is added to one liter of water. In a separate vessel, one pound of cobalt chloride ($CoCl_2.6H_2O$) is dissolved in 3900 cc. of a solution comprising 1 liter of concentrated (28% $NH_3$) ammonium hydroxide. Air is bubbled through the cobalt-ammonium solution for two days. A 1300 cc. portion of the resulting cobalt ammine solution is added to the wet sieve slurry and stirred intermittently at ambient temperatures for 90 minutes. The supernatant liquid is removed by decantation, the sieves washed with water, and reslurried in fresh cobalt ammine solution. This procedure is repeated another time. The sieves are then oven dried at 250° F. and calcined 4 hours at 850° F. A 200 gram batch of the cobalt form sieves are impregnated with 115 cc. of a solution comprising 27.3 grams ammonium molybdate. The composite is oven dried at 250° F. and activated by heating 4 hours at 850° F. This material comprises 10% $MoO_3$ on the cobalt form of a molecular sieve having uniform pore openings of about 13 A. It is designated catalyst "A" in the succeeding examples.

*Example 2*

The sodium alumino silicate having uniform pore openings of about 13 A, is prepared as described in Example 1 above. About 400 grams of this calcined product are wetted with 1 liter $H_2O$. In a separate vessel one pound of nickel chloride ($NiCl_2.6H_2O$) are dissolved in 3 liters of a solution comprising 1 liter of concentrated (28% $NH_3$) ammonium hydroxide and air bubbled through the composite solution for 18 hours to effect formation of the complex nickel ammonium chloride. A one liter portion of the nickel ammine solution is added to the moistened sieve and stirred for about 90 minutes. The supernatant liquid is removed by decantation, the material washed twice with water, and a fresh one liter portion of the nickel ammine solution added. The procedure of treatment is repeated and then repeated another time using another fresh portion of nickel ammine solution. The final material is then filtered, washed well with water, oven dried at 250° F. and calcined 4 hours at 850° F.

One hundred eight-seven grams of the above calcined nickel form sieve are impregnated by a solution comprising 25.9 grams ammonium molybdate. This catalyst is then oven dried at 250° F. and calcined at 850° F. for 4 hours. This catalyst comprises 10% $MoO_3$ on a nickel form molecular sieve having uniform pore openings of about 13 angstroms and is designated catalyst "B" in the following examples.

*Example 3*

This example refers to a description of a commercially available cobalt molybdate on alumina catalyst which is well recognized as having very good hydrodesulfurizing properties. It comprises 3% CoO and 10% $MoO_3$ on Alcoa H-44 alumina base. This commercial catalyst is designated catalyst "C" in the following example.

*Example 4*

Catalyst "A," "B," and "C" were examined for their desulfurization activity by contacting a West Texas heavy naphtha feed comprising 0.31% sulfur in a fixed bed operation at a pressure of 400 p.s.i.g., a hydrogen rate of 2000 c.f.H₂/b., and temperatures in the range of 700–750° F. The data are tabulated below. Liquid product recovery was essentially complete in all cases.

| Catalyst | "A" | "B" | "C" |
|---|---|---|---|
| Feed rate, v./v./Hr | 1.0 | 1.8 | 1.0 |
| Sulfur in liquid product, percent | 0.0015 | 0.034 | 0.0025 |

These data show that catalyst "A" of this invention is highly active and selective in the removal of sulfur from sour petroleum feed streams.

The foregoing description contains a limited number of embodiments of the present invention. It will be understood that the present invention is not limited thereto since numerous variations are permissible without departing from the scope of the following claims.

What is claimed is:

1. A process for the preparation of improved hydrodesulfurization catalysts which comprises mixing an aqueous solution of an alkali metal silicate having a ratio of alkali metal oxide to SiO₂ of at least 0.8 to 1 with a solution of sodium aluminate having a ratio of Na₂O to Al₂O₃ of 1/1 to 3/1 at a temperature of about 160° to about 250° F. in proportions giving a ratio of SiO₂ to Al₂O₃ in the mixture of 2.2/1 to 10/1, maintaining said elevated temperature for at least one hour until crystalline sodium alumino-silicate is formed, recovering the crystalline sodium alumino-silicate having a pore diameter of up to about 13 A., and of size necessary for adsorption of aromatic molecules, base exchanging the sodium alumino-silicate with a cobalt solution to replace at least 50% of the sodium ions with cobalt ions and incorporating from about 5 to 20 wt. percent of MoO₃ with the resultant cobalt alumino-silicate.

2. A process for the preparation of improved hydrodesulfurization catalysts which comprises mixing an aqueous solution of an alkali metal silicate having a ratio of alkali metal oxide to SiO₂ of at least 0.8 to 1 with a solution of sodium aluminate having a ratio of Na₂O to Al₂O₃ of 1/1 to 3/1 at a temperature of about 160° to about 250° F. in proportions giving a ratio of SiO₂ to Al₂O₃ in the mixture of 2.2/1 to 10/1, maintaining said elevated temperature for at least one hour until crystalline sodium alumino-silicate is formed, recovering the crystalline sodium alumino-silicate having pore openings of a diameter of up to about 13 A., necessary for adsorption of aromatic molecules, base exchanging the sodium alumino-silicate with a cobalt solution to replace at least 50% of the sodium ions with cobalt ions, incorporating from about 5 to 20 wt. percent of MoO₃ with the resultant cobalt alumino-silicate, drying and calcining the resultant composition.

3. A process for the preparation of improved hydrodesulfurization catalyst which comprises mixing an aqueous solution of an alkali metal silicate having a ratio of alkali metal oxide to SiO₂ of at least 0.8 to 1 with a solution of sodium aluminate having a ratio of Na₂O to Al₂O₃ of 1/1 to 3/1 at a temperature of about 160° to about 250° F. in proportions giving a ratio of SiO₂ to Al₂O₃ in the mixture of 2.2/1 to 10/1, maintaining said elevated temperature for at least one hour until crystalline sodium alumino-silicate is formed, recovering the crystalline sodium alumino-silicate having pore openings of a diameter up to about 13 A., suitable for adsorption of aromatic molecules base exchanging the sodium alumino-silicate with a cobalt solution to replace at least two-thirds of the sodium ions with cobalt ions and incorporating from about 5 to 20 wt. percent of MoO₃ with the resultant cobalt alumino-silicate.

4. A process for the preparation of improved hydrodesulfurization catalysts which comprises mixing an aqueous solution of an alkali metal silicate having a ratio of alkali metal oxide to SiO₂ of at least 0.8 to 1 with a solution of sodium aluminate having a ratio of Na₂O to Al₂O₃ of 1/1 to 3/1 at a temperature of about 160° to about 250° F. in proportions giving a ratio of SiO₂ to Al₂O₃ in the mixture of 2.2/1 to 10/1, maintaining said elevated temperature for at least one hour until crystalline sodium alumino-silicate is formed recovering the crystalline sodium alumino-silicate having pore openings of a diameter up to about 13 A., suitable for adsorption of aromatic hydrocarbons base exchanging the sodium alumino-silicate with a cobalt solution to replace at least two-thirds of the sodium ions with cobalt ions, incorporating from about 5 to 20 wt. percent of MoO₃ with the resultant cobalt alumino-silicate, drying and calcining the resultant composition.

5. A process for the preparation of improved hydrodesulfurization catalysts which comprises mixing an aqueous solution of an alkali metal silicate having a ratio of alkali metal oxide to SiO₂ of at least 0.8 to 1 with a solution of sodium aluminate having a ratio of Na₂O to Al₂O₃ of 1/1 to 3/1 at a temperature of about 160° to about 250° F. in proportions giving a ratio of SiO₂ to Al₂O₃ in the mixture of 2.2/1 to 10/1, maintaining said elevated temperature for at least one hour until crystalline sodium alumino-silicate is formed recovering the crystalline sodium alumino-silicate having pore openings of a diameter up to about 13 A., suitable for adsorption of aromatic hydrocarbons base exchanging the sodium alumino-silicate with a cobalt ammine solution to replace at least two-thirds of the sodium ions with cobalt ions and incorpating from about 5 to 20 wt. percent of MoO₃ with the resultant cobalt alumino-silicate by treatment thereof with a solution of ammonium molybdate.

6. A process for the preparation of improved hydrodesulfurization catalysts which comprises mixing an aqueous solution of an alkali metal silicate having a ratio of alkali metal oxide to SiO₂ of at least 0.8 to 1 with a solution of sodium aluminate having a ratio of Na₂O to Al₂O₃ of 1/1 to 3/1 at a temperature of about 160° to about 250° F. in proportions giving a ratio of SiO₂ to Al₂O₃ in the mixture of 2.2/1 to 10/1, maintaining said elevated temperature for at least one hour until crystalline sodium alumino-silicate is formed, recovering the crystalline sodium alumino-silicate having pore openings of a diameter up to about 13 A. suitable for adsorption of aromatic hydrocarbons, base exchanging the sodium alumind-silicate with a cobalt ammine solution to replace at least two-thirds of the sodium ions with cobalt ions, incorporating from about 5 to 20 wt. percent of MoO₃ with the resultant cobalt alumino-silicate by treatment thereof with a solution of ammonium molybdate, drying and calcining the resultant composition.

7. A hydrodesulfurization catalyst consisting essentially of a crystalline sodium alumino-silicate suitable for adsorbing aromatic hydrocarbon molecules in its pores having a pore diameter up to about 13 A. in which more than 50% of the sodium ions are replaced by cobalt ions and containing from about 5 to 20 wt. percent of MoO₃.

8. A hydrodesulfurization catalyst consisting essentially of a crystalline sodium alumino-silicate suitable for adsorbing aromatic hydrocarbon molecules in its pores having a pore diameter up to about 13 A. in which more than two-thirds of the sodium ions are replaced by cobalt ions and containing from about 5 to 20 wt. percent of MoO₃.

References Cited in the file of this patent

UNITED STATES PATENTS

| | | |
|---|---|---|
| 1,840,450 | Jaeger | Jan. 12, 1932 |
| 2,212,034 | Morrell | Aug. 20, 1940 |
| 2,375,756 | Bates | May 15, 1945 |
| 2,608,534 | Fleck | Aug. 26, 1952 |
| 2,897,143 | Lester et al. | July 28, 1959 |
| 2,901,422 | Peery | Aug. 25, 1959 |